United States Patent
Zhang et al.

(10) Patent No.: US 12,075,330 B2
(45) Date of Patent: Aug. 27, 2024

(54) ACCESS CONTROL

(71) Applicant: Apple Inc., Cupertino, CA (US)

(72) Inventors: Dawei Zhang, Saratoga, CA (US); Fangli Xu, Beijing (CN); Haijing Hu, Los Gatos, CA (US); Naveen Kumar R. Palle Venkata, San Diego, CA (US); Ralf Rossbach, Munich (DE); Sarma V. Vangala, Campbell, CA (US); Sethuraman Gurumoorthy, San Ramon, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 17/441,254

(22) PCT Filed: May 10, 2021

(86) PCT No.: PCT/CN2021/092825
§ 371 (c)(1),
(2) Date: Sep. 20, 2021

(87) PCT Pub. No.: WO2022/236594
PCT Pub. Date: Nov. 17, 2022

(65) Prior Publication Data
US 2022/0361088 A1    Nov. 10, 2022

(51) Int. Cl.
*H04W 48/02*    (2009.01)
*H04W 4/06*    (2009.01)
(Continued)

(52) U.S. Cl.
CPC .............. *H04W 48/02* (2013.01); *H04W 4/06* (2013.01); *H04W 74/0833* (2013.01); *H04W 76/11* (2018.02)

(58) Field of Classification Search
None
See application file for complete search history.

(56) References Cited

U.S. PATENT DOCUMENTS

2005/0243721 A1* 11/2005 Cai .......................... H04L 12/18
370/278
2016/0337817 A1* 11/2016 Malladi ................. H04W 72/30
(Continued)

FOREIGN PATENT DOCUMENTS

| CN | 106063333 | 10/2016 |
|---|---|---|
| EP | 3214872 | 9/2017 |

OTHER PUBLICATIONS

[AT113bis-e][031][MBS17] MBS Session Activation (Nokia), Rapporteur (Nokia) 3GPP TSG-RAN WG2 Meeting #113bis Electronic R2-2104577, Apr. 20, 2021, 24 pages.
(Continued)

*Primary Examiner* — Otis L Thompson, Jr.
(74) *Attorney, Agent, or Firm* — Kilpatrick Townsend & Stockton LLP

(57) ABSTRACT

Provided is a method for a user equipment (UE), comprising: acquiring a notification for participating in an access control process for an multicast/broadcast service (MBS) session; and participating in an access control process for the MBS session by using MBS specific configuration information.

16 Claims, 8 Drawing Sheets

(51) Int. Cl.
*H04W 74/0833* (2024.01)
*H04W 76/11* (2018.01)

(56) References Cited

U.S. PATENT DOCUMENTS

| | | | |
|---|---|---|---|
| 2017/0013423 A1* | 1/2017 | Zisimopoulos | H04L 12/189 |
| 2018/0109992 A1 | 4/2018 | Lee et al. | |
| 2019/0082376 A1 | 3/2019 | Hong et al. | |
| 2019/0098540 A1* | 3/2019 | Lee | H04W 36/0085 |
| 2019/0159108 A1* | 5/2019 | Lee | H04W 76/27 |
| 2019/0174395 A1* | 6/2019 | Choe | H04W 72/56 |
| 2020/0275344 A1* | 8/2020 | Byun | H04W 74/0833 |
| 2020/0351754 A1* | 11/2020 | Kim | H04W 48/02 |
| 2021/0007041 A1* | 1/2021 | Wallentin | H04W 48/02 |
| 2021/0227450 A1* | 7/2021 | Chun | H04W 48/20 |
| 2021/0266817 A1* | 8/2021 | Wallentin | H04W 36/08 |
| 2021/0410045 A1* | 12/2021 | Kadiri | H04W 48/06 |
| 2022/0217507 A1* | 7/2022 | Wang | H04W 48/08 |
| 2022/0286818 A1* | 9/2022 | Chin | H04W 24/08 |
| 2023/0046529 A1* | 2/2023 | Baek | H04W 76/40 |
| 2023/0180349 A1* | 6/2023 | Zhu | H04W 40/00 370/312 |
| 2023/0199868 A1* | 6/2023 | Kedalagudde | H04W 76/10 370/328 |
| 2023/0209636 A1* | 6/2023 | Han | H04W 24/02 370/329 |
| 2023/0213933 A1* | 7/2023 | El Essaili | H04W 4/40 701/2 |
| 2023/0262423 A1* | 8/2023 | Fujishiro | H04W 76/40 370/329 |

OTHER PUBLICATIONS

Discussion on MBS Session Activation/Deactivation and UAC, Spreadtrum Communications 3GPP TSG-RAN WG2 Meeting #113-bis Electronic R2-2103254, Apr. 20, 2021, 4 pages.

International Patent Application No. PCT/CN2021/092825, International Search Report and Written Opinion, Mailed on Feb. 9, 2022, 9 pages.

New Work Item on NR Multicast and Broadcast Services, Huawei, 3GPP TSG RAN Meeting #86, RP-193248, Dec. 9-12, 2019, 5 pages.

Revised SID: Architectural enhancements for 5G multicast-broadcast services, SA WG2, 3GPP TSG SA Meeting #85, SP-190625, Sep. 17-20, 2019, 4 pages.

Reply LS on 5MBS progress and issues to address, 3GPP TSG-WG SA2 Meeting #143E, R2-2102666, Apr. 12-20, 2021, 2 pages.

3rd Generation Partnership Project; Technical Specification Group Radio Access Network; NR; User Equipment (UE) procedures in Idle mode and RRC Inactive state (Release 16), 3GPP TS 38.304 V16.4.0, Mar. 2021, 39 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

* cited by examiner

ACCESS CONTROL

CROSS-REFERENCES TO RELATED APPLICATIONS

This application is a U.S. National Stage Application of PCT/CN2021/092825 filed May 10, 2021. The disclosure of which is herein incorporated by reference in its entirety for all purposes.

TECHNICAL FIELD

This application relates generally to wireless communication systems, and more specifically to access control for multicast/broadcast service (MBS).

BACKGROUND

Wireless mobile communication technology uses various standards and protocols to transmit data between a base station and a wireless mobile device. Wireless communication system standards and protocols can include, but not limited to, the 3rd Generation Partnership Project (3GPP) long term evolution (LIE); fifth-generation (5G) 3GPP new radio (NR) standard; technologies beyond 5G. In fifth generation (5G) wireless RANs. RAN Nodes can include a 5G Node, new radio (NR) node or g Node B (gNB), which communicate with a wireless communication device, also known as user equipment WE).

SUMMARY

According to an aspect of the present disclosure, a method for a user equipment (UE) is provided that comprises: acquiring a notification for participating in an access control process for an multicast/broadcast service (MBS) session; and participating in the access control process for the MBS session by using MBS specific configuration information.

According to an aspect of the present disclosure, a method for a base station is provided that comprises: providing a notification for an access control process for an multicast/broadcast service (MBS) session; and performing the access control process for the MBS session by using MBS specific configuration information.

According to an aspect of the present disclosure, an apparatus for a user equipment (UE) is provided, the apparatus comprising: one or more processors configured to perform steps of the method as describe above.

According to an aspect of the present disclosure, an apparatus for a base station is provided the apparatus comprising: one or more processors configured to perform steps of the method as describe above.

According to an aspect of the present disclosure, a computer readable medium having computer programs stored thereon which, when executed by one or more processors, cause an apparatus to perform steps of the method as describe above.

According to an aspect of the present disclosure, an apparatus for a communication device is provided, comprising means for performing steps of the method as describe above.

According to an aspect of the present disclosure, a computer program product is provided, comprising computer programs which, when executed by one or more processors, cause an apparatus to perform steps of the method as describe above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include an RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In the related art, the access control mechanism that is able to be used for the multicast/broadcast service (MBS) is still being studied. The UE in an idle or inactive state needs to resume or set up the connection so as to receive the activated MBS. However, if many UEs initiate the connection setup or resume procedure at the same time, a network congestion will occur if there is no related access control mechanism for it.

Aiming at this, it is provided by the present disclosure the access control for the MBS. Various aspects of the present disclosure will be described below in conjunction with the accompanying drawings.

Figure 1:
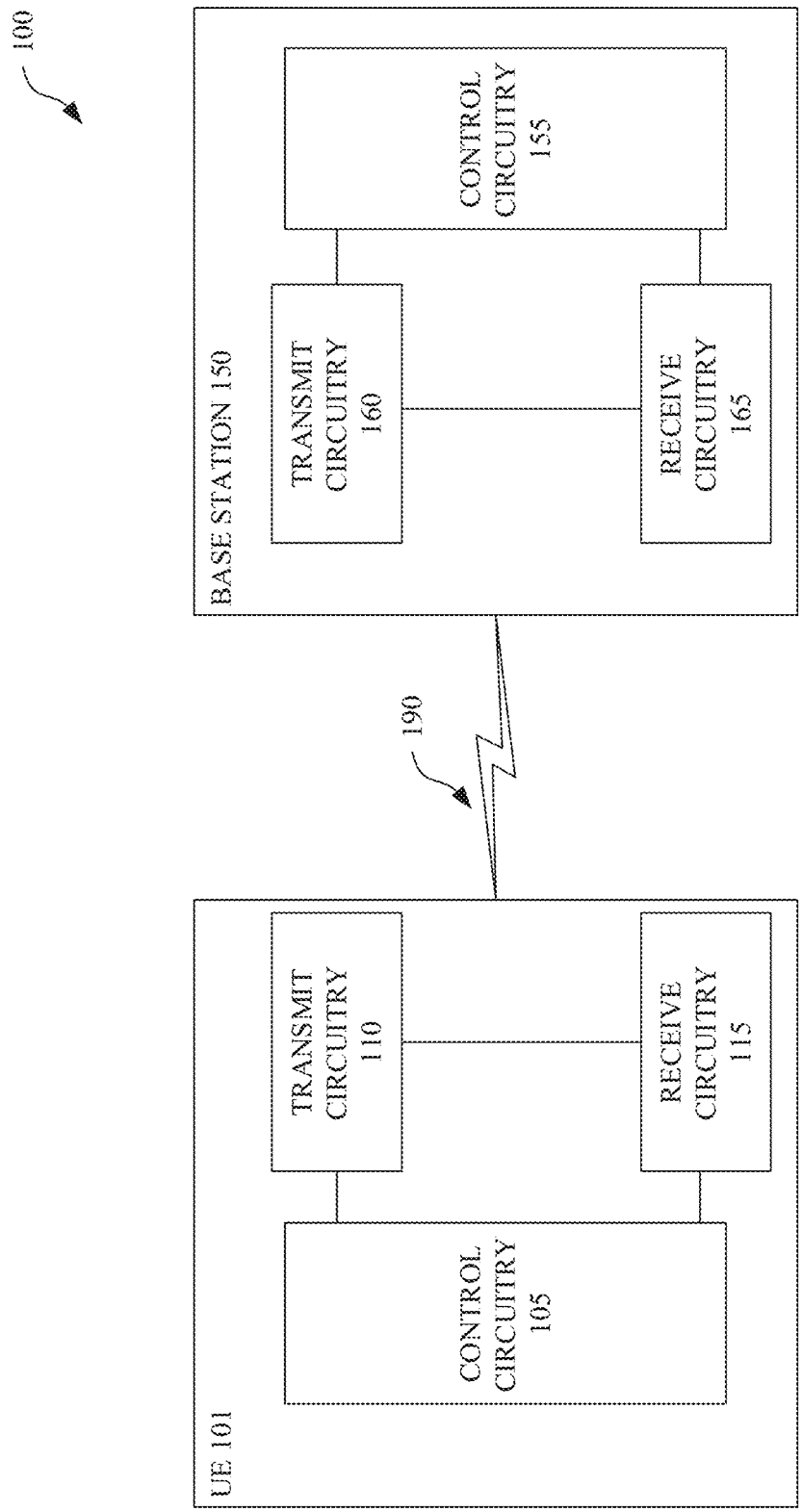
FIG. 1 is a block diagram of a system including a base station and a user equipment (UE) in accordance with some embodiments.

FIG. 1 is a block diagram of a system including a base station and a user equipment (UE) in accordance with some embodiments. FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 may provide network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and various base stations to be described in the following embodiments may be implemented by the UE 101 and the base station 150 as described in FIG. 1.

Figure 2:
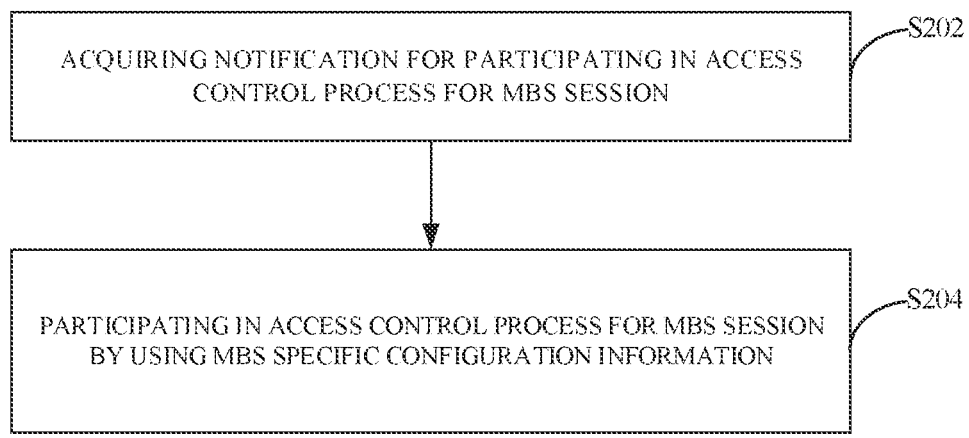
FIG. 2 illustrates a flow chart for an exemplary method for a UE in accordance with some embodiments.

FIG. 2 illustrates a flow chart for an exemplary method for a UE in accordance with some embodiments. The method 200 illustrated in FIG. 2 may be implemented by the UE 101 as described in FIG. 1.

As shown in FIG. 2. The method 200 for the UE may include the following steps: S202, acquiring a notification for participating in an access control process for an multicast/broadcast service (MBS) session; and S204, participating in the access control process for the MBS session by using MBS specific configuration information.

At the step S202, the UE may acquire the notification for participating in the access control process for the MBS session from the base station. Here, the base station may be implemented by the base station 150 as described in FIG. 1.

In some embodiments, the notification for participating in the access control process for the MBS session may include an activation notification of the MBS session.

Upon receiving the activation notification of the MBS session, the UE that is in e.g., the idle or inactive state may be able to enter into the connected state to receive the activated MBS session.

Hereinafter, each of the idle, inactive and connected states refers to the radio resource control (RRC) state and may be noted as RRC_IDLE state, RRC_INACTIVE state and RRC_CONNECTED state, respectively. Accordingly, the transition from the RRC_IDLE or RRC_INACTIVE state to the RRC_CONNECTED state may refer to the procedure of RRC connection setup or RRC resume, respectively.

In other words, for the case that the procedure of RRC connection setup or RRC resume of the UE is triggered by the activation notification of the MBS session, an access control process is to be conducted between the UE and the base station.

In some embodiments, the notification for participating in the access control process for the MBS session may be associated with events other than the MBS event. In this case, if the UE in the RRC_IDLE or RRC_INACTIVE state is interested in some MBS service which has been activated and would like to enter into the RRC_CONNECTED state, the MBS specific access control mechanism may also be applicable.

At the step S204, the UE may participate in the access control process for the MBS session by using the MBS specific configuration information.

In the present disclosure, the MBS specific configuration information means the information that is specifically or dedicatedly configured for the MBS to introduce into the access control process.

The access control process may involve with various stages such as the unified access control (UAC), the random access channel (RACH) configuring (e.g., the RACH backoff) and the initial access procedure. Accordingly, the MBS specific configuration information may be used in those stages for the UE to participate in.

In other words, in order to achieve the access control for the MBS (i.e., the reception of MBS, since the MBS is only for downlink (DL)), the MBS specific UAC mechanism, the MBS specific RACH configuring (e.g., RACH backoff mechanism) and the MBS specific control in the initial access procedure are proposed in the present disclosure. Further details will be described below with reference to FIGS. 3 to 5.

According to some embodiments of the present disclosure, it is possible to achieve dynamic access control for the MBS and thus mitigate or avoid the network congestion.

Figure 3:
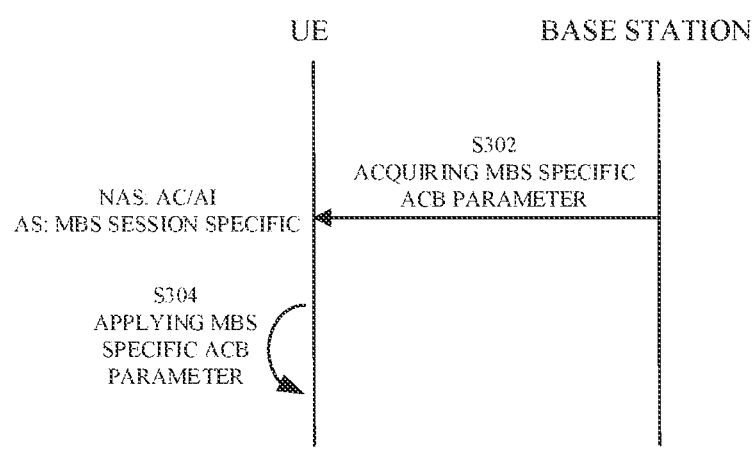
FIG. 3 illustrates a schematic diagram of an MBS specific UAC mechanism in accordance with some embodiments.

FIG. 3 illustrates a schematic diagram of the MBS specific UAC mechanism in accordance with some embodiments. Similarly as above, the UE and the base station as shown in FIG. 3 may be implemented by the UE 101 and the base station 150 as described in FIG. 1.

As mentioned above, the UAC is one of the stages that the UE may participate in by using the MBS specific configuration information. Accordingly. FIG. 3 illustrates the method 300 for the UE in the MBS specific UAC mechanism, which may be an embodiment of the step 204 as described in FIG. 2.

The method 300 may include the following steps: S302, acquiring, as the MBS specific configuration information, an MBS specific access class barring (ACB) parameter, and S304, applying the MBS specific ACB parameter to trigger resuming or setting up of a radio resolute control (RRC) connection for the MBS session.

In the case of unicast service, an ACB parameter may generally refer to the barring factor (known as the parameter "uac-BarringFactor") and the barring time (known as the parameter "uac-BarringTime") used in the process of UAC.

In the present disclosure, in order to achieve the access control for the MBS, the ACB parameter is redesigned as the MBS specific ACB parameter to cope with the MBS, so that the resuming or setting up of the RRC connection for the MBS may be triggered for the UE in the RRC_IDLE or RRC_INACTIVE state.

The MBS specific UAC mechanism as proposed in the present disclosure may be implemented in two options.

Option 1:

In some embodiments, the step S302 of acquiring the MBS specific ACB parameter may be associated with the use of the non-access stratum (NAS) of the UE. In this case, the UE may acquire access category (AC) and access identify (AI) information that is mapped to an MBS session ID of the MBS session, and then identify the MBS specific ACB parameter from the AC and AI information.

In this way, the ACB parameter to be used in the process of the UAC may have a linkage or a mapping relationship with the MBS session, and thus the UE may then use the ACB parameter to trigger the procedure of RRC connection setup or RRC resume for the MBS session.

In some embodiments, the AC and AI information may be preconfigured in user data of the UE, or received via a system information block (SIB) broadcast or a NAS MBS session joint procedure. For the broadcast case, the AC and AI information may be provided via SIB 1 as legacy. As such, various occasions may be existed for the UE to acquire the AC and AI information that is needed.

Option 2;

In some embodiments, step S302 of acquiring the MBS specific ACB parameter may be associated with the use of the access stratum (AS), rather than the NAS of the UE. In this case, the UE may receive an MBS session specific ACB configuration that is linked to an MBS session ID of the MBS session and then identify the MBS specific ACB parameter from the MBS session specific ACB configuration.

An example of the MBS session specific ACB configuration is as follows:

```
uac-BarringInfo            SEQUENCE {                           OPTIONAL,    -- Need S
   uac-BarringFormbs            UAC-BarringPerMBSList               OPTIONAL,    -- Need S
   uac-BarringForcommon         UAC-BarringPerCatList               OPTIONAL,    -- Need S
   uac-BarringPerPLMN-List      UAC-BarringPerPLMN-List
   uac-BarringInfoSetList       UAC-BarringInfoSetList
   uac-AccessCategory1-selectionAssistanceInfo Choice {
      plmnCommon                        UAC-AccessCategory1-SelectionAssistanceInfo,
      individualPLMNList                SEQUENCE (SIZE (2 . . maxPLMN) ) OF UAC-AccessCategoryl-
                                        SelectionAssistanceInfo
   }                                                                OPTIONAL,    -- Need S
}
UAC-BarringPerMBS : :=      SEQUENCE (SIZE (1 .. mazAccessCat-1) ) OF UAC-BarringPerMBS
UAC-BarringPerMBS : :=      SEQUENCE {
   mBSSessionId                  INTEGER (1 . . maxMbsSessionID-1) ,
   Uac-barringInfoSetIndex       UAC-BarringInfoSetIndex
}
``` where the items associated with "uac-BarringForMBS" are the new items specifically configured for the MBS, adding to the current ACB configuration for e.g. the unicast service.

Since the MBS session ID may be visible to the AS of the UE, the process of the UAC may skip the use of the NAS and thus the ACB parameter may have a directly linkage with the MBS session. Therefore, the UE may then use the ACB parameter to trigger the procedure of RRC connection setup or RRC resume for the MBS session in a simpler way.

Therefore, according to some embodiments of the present disclosure, it is possible to achieve dynamic access control for the MBS in the process of the UAC and thus mitigate or avoid the network congestion.

According to an aspect of the present disclosure, in the practical application there would exist a scenario that the UE receives multiple MBS session activation notifications at the same time. Accordingly, the UE may acquire multiple MBS specific ACB parameters corresponding to the multiple MBS sessions at the same time, although it is illustrated in FIG. 3 a one-MBS-session case.

In this case, the UE needs to decide which MBS session it is going to follow. In other words, the UE shall select a proper MBS specific ACB parameter among the multiple MBS specific ACB parameters that are simultaneously acquired.

As aforesaid, since the ACB parameter to be used in the process of the UAC may have a linkage or a mapping relationship with the MBS session (i.e., the MBS session ID), it is possible for the UE to select one MBS specific ACB parameter according to one of the following rules:
1) the maximum MBS session ID; 2) the minimum MBS session ID; 3) the MBS session ID with the highest QoS requirement 4) the ACB parameter with the largest barring factor, 5) the ACB parameter with the shortest barring time; 6) up to the UE implementation.

Therefore, the step S202 of FIG. 2 may further include acquiring multiple activation notifications of multiple MBS sessions at the same time, and thus the step S302 of FIG. 3 may include acquiring multiple MBS specific ACB parameters corresponding to the multiple MBS sessions at the same time. In this case, the method 200 of FIG. 2 may further include: before the step 204 of participating in the access control process for the MBS session, selecting a proper MBS specific ACB parameter among the multiple MBS specific ACB parameters based on the above rules.

In this way, in a case that this is a difficulty for the UE to choose the MBS session when multiple MBS session activation notifications are received at the same time, a faster access mechanism may be provided.

According to an aspect of the present disclosure, in the practical application there would also exist a scenario that the UE receives activation notifications of the MBS session and the non-MBS session at the same time. Accordingly, the UE may acquire the MBS specific ACB parameter and the non-MBS specific ACB parameter at the same time, although it is illustrated in FIG. 3 an only-MBS-session case.

In this case, the UE may follow the MBS session or the non-MBS session by applying the corresponding ACB parameters. That is, the UE may either follow the non-MBS session to select the non-MBS specific ACB parameter, or follow the MBS session to select the MBS specific ACB parameter.

Besides, the UE may follow a session with a higher priority between the MBS session and the non-MBS session. For example, the non-MBS session may be a RAN updating triggered event which has a lower priority than the MBS session. In addition, the non-MBS session may be an AS/NAS signaling triggered event, which has a higher priority than the MBS session. Besides, the session (either the MBS session or the non-MBS session) with a higher quality of service (QoS) requirement may have a higher priority.

In other words, the step S202 of FIG. 2 may include acquiring the activation notification of the MBS session and an activation notification of a non-MBS session at the same time, and thus the step S302 of FIG. 3 may include acquiring the MBS specific ACB parameter and a non-MBS specific ACB parameter corresponding to the non-MBS session at the same time. In this case, the method 300 of FIG. 3 may further include determining to follow the MBS session before the step S304.

Figure 4:
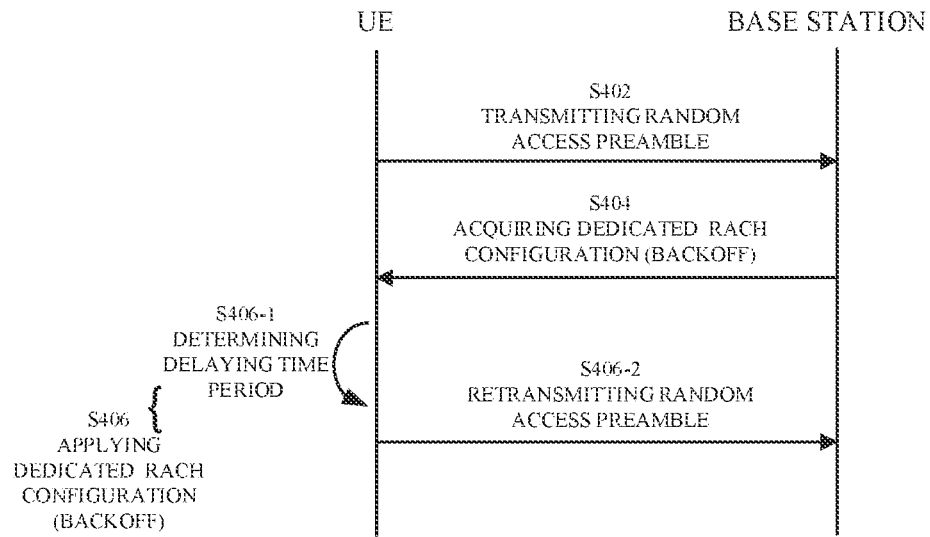
FIG. 4 illustrates a schematic diagram of an MBS specific RACH configuring in accordance with some embodiments.

FIG. 4 illustrates a schematic diagram of the MBS specific RACH configuring in accordance with some embodiments. Similarly as above, the UE and the base station as shown in FIG. 4 may be implemented by the UE 101 and the base station 150 as described in FIG. 1.

As mentioned above, the RACH configuring is also one of the stages that the UE may participate in by using the MBS specific configuration information. Accordingly. FIG. 4 illustrates the method 400 for the UE in the MBS specific RACH configuring which may be another embodiment of the step 204 as described in FIG. 2.

The method 400 may include the following steps: S404, acquiring, as the MBS specific configuration information, a dedicated random access channel (RACH) configuration for the RACH triggered by the activation notification of the MBS session; and S406, applying the dedicated RACH configuration to an initial access triggered by the activation notification of the MBS session.

Before the step S404, the UE may have transmitted (S402) a random access preamble to the base station for the RACH triggered by the activation notification of the MBS session. However, the UE does not receive it own MAC random access response (RAR), but receive the information for performing the RACH backoff at the step S404.

In some embodiments, the dedicated RACH configuration may include an MBS specific backoff parameter indicating prioritization of one or more MBS sessions. Accordingly, the step S406 of applying the dedicated RACH configuration may include: S406-1, determining a delaying time period for retransmitting a random access preamble by multiplying the MBS specific backoff parameter with a backoff indicator (BI); and S406-2, retransmitting the random access preamble after the delaying time period has elapsed.

An example of the MBS specific backoff parameter is as follows:

```
ra-prioitizationForMBS SEQUENCE {
    ra-prioitization-r16                    RA-Prioritization,
    ra-prioitizationForMBSSession-r16       BIT STRING (SIZE (8) )
}
RA-Prioritization : : =               SEQUENCE {
    powerRampingStepHighPriority          ENUMERATED {dB0, dB2, dB4, dB6} ,
    scalingFactorBI                       ENUMERATED {zero, dB25, dot5, dot75}    OPTIONAL,    -- Need R
    . . .
}
```

The MBS specific backoff parameter as shown above may be associated with one or more MBS sessions. That, the same MBS specific backoff parameter may be used for multiple MBS sessions. Furthermore, the MBS specific backoff parameter may indicate prioritization of an MBS session. Since it is associated with one or more MBS sessions, it may indicate prioritization of one or more MBS sessions as well.

The prioritization may refer to the prioritizing or the deprioritizing, implying the decreasing or increasing for the time period of the RACH backoff. Since the BI, which has a fixed value indicates the delaying time period for the UE to retransmit the random access preamble, it may be possible to decrease or increase the time period of the RACH backoff by multiplying the BI with a designed factor or coefficient. Herein, the designed factor or coefficient is the MBS specific backoff parameter as above mentioned. In this way, the RACH backoff can be dynamically controlled to avoid congestion.

For example, assuming the BI is 100 ms, the time period of the RACH backoff may be decreased if the MBS specific backoff parameter takes a value smaller than 1, and may be increased if it takes a value larger than 1.

Therefore, according to some embodiments of the present disclosure, it is possible to achieve dynamic access control for the MBS in the process of the RACH configuring and thus mitigate or avoid the network congestion.

In the case that the base station does not provide the MBS specific backoff parameter, the UE may use the common RACH configuration for the initial access which is triggered by the MBS activation notification.

Figure 5:
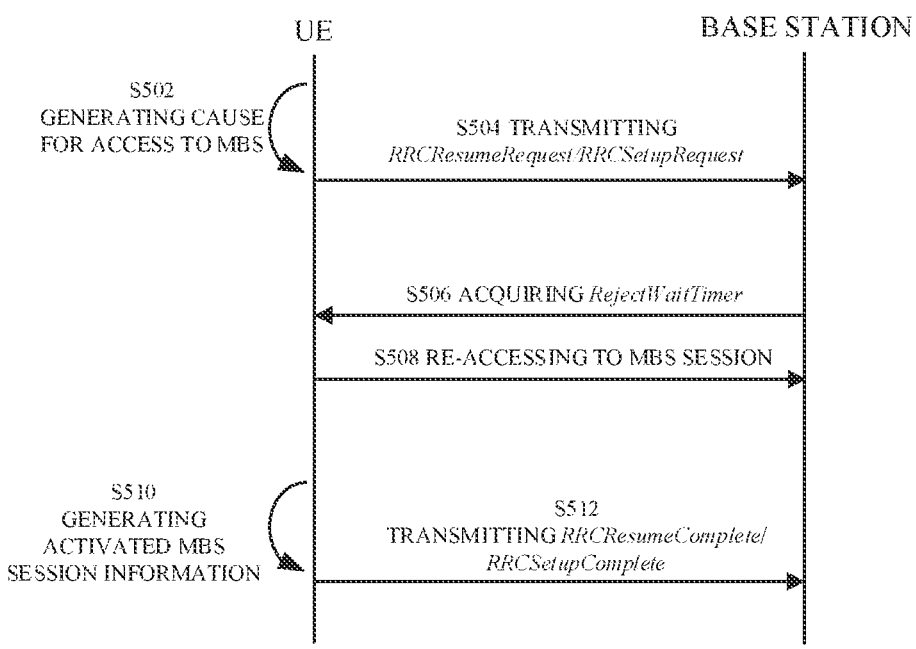
FIG. 5 illustrates a schematic diagram of an MBS specific control in the initial access procedure in accordance with some embodiments.

FIG. 5 illustrates a schematic diagram of the MBS specific control in the initial access procedure in accordance with some embodiments. Similarly as above, the UE and the base station as shown in FIG. 5 may be implemented by the UE 101 and the base station 150 as described in FIG. 1.

As mentioned above, the initial access procedure is also one of the stages that the UE may participate in by using the MBS specific configuration information. Accordingly. FIG. 5 illustrates the method 500 for the UE in the MBS specific control the initial access procedure, which may be a further embodiment of the step 204 as described in FIG. 2.

In some embodiments, the MBS specific configuration information includes information specific to the MBS session that is to be used during a process of an initial access triggered by the activation notification of the MBS session. Accordingly, the step 204 of participating in the access control process for the MBS session by using the MBS specific configuration information may includes: applying the information specific to the MBS session during the process of the initial access.

In this way, the process of the initial access may be dynamically controlled to mitigate or avoid the network congestion.

In some embodiments, applying the information specific to the MBS session may include the following steps: S502, generating, as the information specific to the MBS session, a cause for an access to the MBS session in a request of resuming (noted as "RRCResumeRequest") or setting up a RRC connection (noted as "RRCSetupRequest"); and S504, transmitting the request of resuming or setting up the RRC connection.

An example of the RRCResumeRequest and the RRC-SetupRequest are as follows:

```
RRCResumeRequest : :=                    SEQUENCE {
    rrcResumeRequest                         RRCResumeRequest -IEs
}
RRCResumeRequest-IEs ; :=                SEQUENCE {
    resumeIdentity                           ShortI-RNTI-Value,
    resumeMAC-I                              BIT STRING (SIZE (16) ) ,
    resumeCause                              ResumeCause,
    Spare                                    BIT STRING (SIZE (1) )
}
ResumeCause : :=         ENUMERATED    {emergency, highPriorityAccess, mt-Access, mo-Signalling,
                                        Mo-Data, mo-VoiceCall, mo-VideoCall, mo-SMS, RNA-Update, mps-PriorityAccess,
                                        Mcs-priority Access, |MBS-access, spare2, spare3, spare4, spare5 )
```

```
RRCResumeRequest : :=      SEQUENCE {
    rrcSetupRequest            RRCSetupRequest -IEs
}
RRCSetupRequest-IEs ; :=   SEQUENCE {
    ue-Identity                InitialUE-identity,
    establishmentCause         EstablishmentCause,
    Spare                      BIT STRING (SIZE (1) )
}
InitialUE-Identity : :=    CHOICE {
    Ng-5G0S0TMSI-Part1         BIT STRING (SIZE (39) ),
    random Value               BIT STRING (SIZE (39) )
}
EstablishmentCause : :=    ENUMERATED {
                             emergency, highPriorityAccess, mt-Access, mo-Signalling,
                             Mo-Data, mo-VoiceCall, mo-VideoCall, mo-SMS, mps-PriorityAccess, Mes-priorityAccess,
                             |MBS-access, spare5, spare4, spare3, spare2, spare1 )
``` where each of the items "resumeCause" and "establishmentCause" is the above-mentioned cause for the access to the MBS session. Note that the original items "spare1" and "spare 6" are modified as "MBS-access".

The access to the MBS session may be further divided into the high or low access, indicating the priority the MBS session. The high or low access may be preconfigured by the NA or AS of the UE.

By using the MBS access cause, it is possible for the base station to differentiate the MBS access from other types of access.

In some embodiments, applying the information specific to the MBS session may include the following steps: S506, acquiring, as the information specific to the MBS session, a time period for deprioritizing an access to the MBS session; and S508, re-accessing to the MBS session after the time period has elapsed.

The time period for deprioritizing an access to the MBS session may be indicated by a parameter noted as "Reject-WaitTimer" from the message noted as "RRCReject" or "RRCRelease" sending by the base station. This implies that the congestion occurs and thus the base station provides the time period for the UE to wait for the next initial access for the MBS session.

During the time period of RejectWaitTimer, if other event (e.g. the unicast service, the NAS procedure) triggers the initial access, the UE may trigger that initial access directly.

An example of the RejectWaitTimer is as follows:

cation for an access control process for an multicast/broadcast service (MBS) session; and S604, performing the access control process for the MBS session by using MBS specific configuration information.

At the step S602, the base station may provide the notification for the access control process for the MBS session to the UE. Here, the UE may be implemented by the UE as described in FIG. 1.

In some embodiments, the notification for the access control process for the MBS session may include an activation notification of the MBS session.

Upon receiving the activation notification of the MBS session, the UE that is in the RRC_IDLE or RRC_INACTIVE state may be able to enter into the RRC_CONNECTED state to receive the activated MBS session. Accordingly, the transition from the RRC_IDLE or RRC_INACTIVE state to the RRC_CONNECTED state may refer to the procedure of RRC connection setup or RRC resume, respectively.

As has been described with reference to FIG. 2, for the case that the procedure of RRC connection setup or RRC

```
RRCReject ::=            SEQUENCE {
    Critical Extensions      CHOICE (
        rrcReject                RRCReject-IEs,
        criticalExtensionsFuture  SEQUENCE { }
    }
}
RREReject-IEs : :=       SEQUENCE {
    waitTime                 RejectWaitTime                       OPTIONAL,  -- Need N
    mBSwaitTime              RejectWaitTime                       OPTIONAL,  -- Need N
    lateNonCriticalExtension OCTET STRING                         OPTIONAL,
    nonCriticalExtension     SEQUENCE { )                         OPTIONAL,
}
RRCRelease-v1540-IEs : := SEQUENCE {
    waitTime                 Reject WaitTime      OPTIONAL,  -- Need N
    mBSwaitTime              Reject WaitTime      OPTIONAL,     -- Need N
    nonCriticalExtension     RRCRELEASE-v1610-IEs OPTIONAL
}
```

In some embodiments, applying the information specific to the MBS session may include the following steps: S510, generating, as the information specific to the MBS session, information about the activated MBS session in a message informing of an completion of the initial access for the MBS session; and S512, transmitting the message informing of the completion of the initial access for the MBS session.

The message informing of the completion of the initial access for the MBS session may include the message noted as "RRCResumeComplete" or "RRCSetupComplete".

Upon completion of the initial access for the MBS session, the base station may determine a point-to-multipoint (PTM) or point-to-point (PTP) MBS configuration in the RRC_CONNECTED Trade, or handover the UE to the cell where to provide the UE interested MBS session.

Therefore, according to some embodiments of the present disclosure, it is possible to achieve dynamic access control for the MBS in the process of the initial access and thus mitigate or avoid the network congestion.

Please note that the steps S502 to S512 are not necessary to be performed consecutively. Additional or further step(s) may be inserted therebetween for respective functions. Besides, the steps S502 to S512 may not all be performed, which may be decided in view of the practical application.

Figure 6:
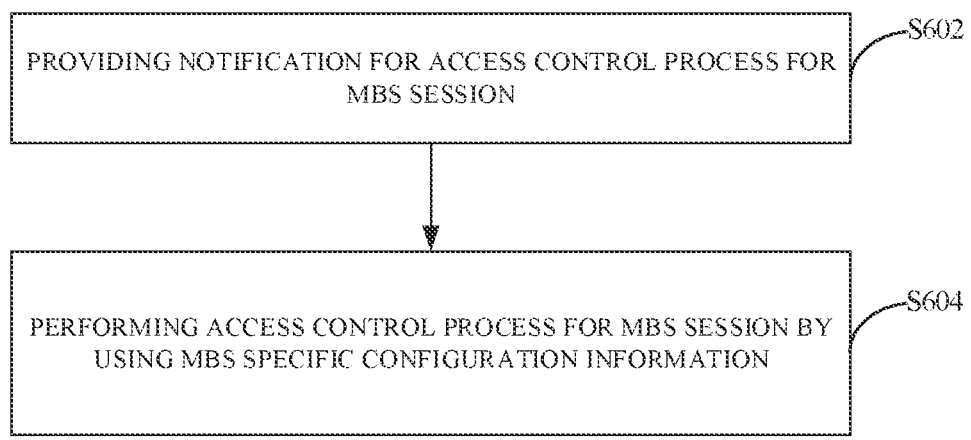
FIG. 6 illustrates a flow chart for an exemplary method for a base station in accordance with some embodiments.

FIG. 6 illustrates a flow chart for an exemplary method for a base station in accordance with some embodiments. The method 600 illustrated in FIG. 6 may be implemented by base station 150 as described in FIG. 1

As shown in FIG. 6. The method 600 for the base station may include the following steps: S602, providing a notifiresume of the UE is triggered by the activation notification of the MBS session, an access control process is to be conducted between the UE and the base station.

In some embodiments, the notification for the access control process for the MBS session may be associated with events other than the MBS event. In this case, if the UE in the RRC_IDLE or RRC_INACTIVE state is interested in some MBS service which has been activated and would like to enter into the RRC_CONNECTED state, the MBS specific access control mechanism may also be applicable.

At the step S604, the base station may perform an access control process for the MBS session by using MBS specific configuration information.

As has been described in details with reference to FIGS. 2 to 5, the MBS specific configuration information may refer to the information that is specifically or dedicatedly configured for the MBS and introduced into the access control process.

In order to achieve the access control for the MBS, the MBS specific UAC mechanism, the MBS specific RACH configuring (e.g., RACH backoff mechanism) and the MBS specific control in the initial access procedure are proposed in the present disclosure.

According to some embodiments of the present disclosure, it is possible to achieve dynamic access control for the MBS and thus mitigate or avoid the network congestion.

In some embodiments, the step 604 may further include: providing, as the MBS specific configuration information, an MBS specific access class barring (ACB) parameter, which is to be used for triggering of resuming or setting up of a radio resource control (RRC) connection for the MBS session. This step of the base station may correspond to the step S302 of the UE as described in FIG. 3.

In some embodiments, providing the MBS specific ACB parameter may include: providing access category (AC) and access identify (AI) information that is mapped to an MBS session ID of the MBS session, from which the MBS specific ACB parameter is identified. This step of the base station may correspond to that of the UE in "Option 1" as described in FIG. 3.

In some embodiments, providing the AC and AI information may include: sending the AC and AI information via a system information block (SIB) broadcast or a non-access stratum (NAS) MBS session joint procedure.

In some embodiments, providing the MBS specific ACB parameter may include: sending an MBS session specific ACB configuration that is linked to an MBS session ID of the MBS session, from which the MBS specific ACB parameter is identified. This step of the base station may correspond to that of the UE in "Option 2" as described in FIG. 3.

In some embodiments, the step 604 may include: providing, as the MBS specific configuration information, a dedicated random access channel (RACH) configuration for the RACH triggered by the activation notification of the MBS session, which is to be used for an initial access triggered by the activation notification of the MBS session. This step of the base station may correspond to the step S404 of the UE as described in FIG. 4.

In some embodiments, the dedicated RACH configuration may include an MBS specific backoff parameter indicating prioritization of one or more MBS sessions, which is to be multiplied with a backoff indicator (BI) to determine a delaying time period for retransmitting of a random access preamble. This may correspond to the step S406-1 of the UE as described in FIG. 4.

In some embodiments, the MBS specific configuration information may include information specific to the MBS session that is to be used during a process of an initial access triggered by the activation notification of the MBS session. This has been described with reference to FIG. 5.

In some embodiments, the step 604 may further include: receiving, as the information specific to the MBS session, a cause for an access to the MBS session, which is to be used for resuming or setting up of a RRC connection for the MBS session. This step of the base station may correspond to the step S504 of the UE as described in FIG. 5.

In some embodiments, the step 604 may include: providing, as the information specific to the MBS session, a time period for deprioritizing an access to the MBS session, which is to be used for re-accessing to the MBS session after the time period has elapsed. This step of the base station may correspond to the step S506 of the UE as described in FIG. 5.

In some embodiments, the step 604 may include: receiving, as the information specific to the MBS session, information about the activated MBS session, via a message informing of an completion of the initial access for the MBS session. This step of the base station may correspond to the step S512 of the UE as described in FIG. 5.

In some embodiment, upon completion of the initial access for the MBS session, the base station may determine a point-to-multipoint (PTM) or point-to-point (PTP) MBS configuration in a RRC connected mode, or preforming a handover to a cell where the MBS session is to be provided.

Figure 7:
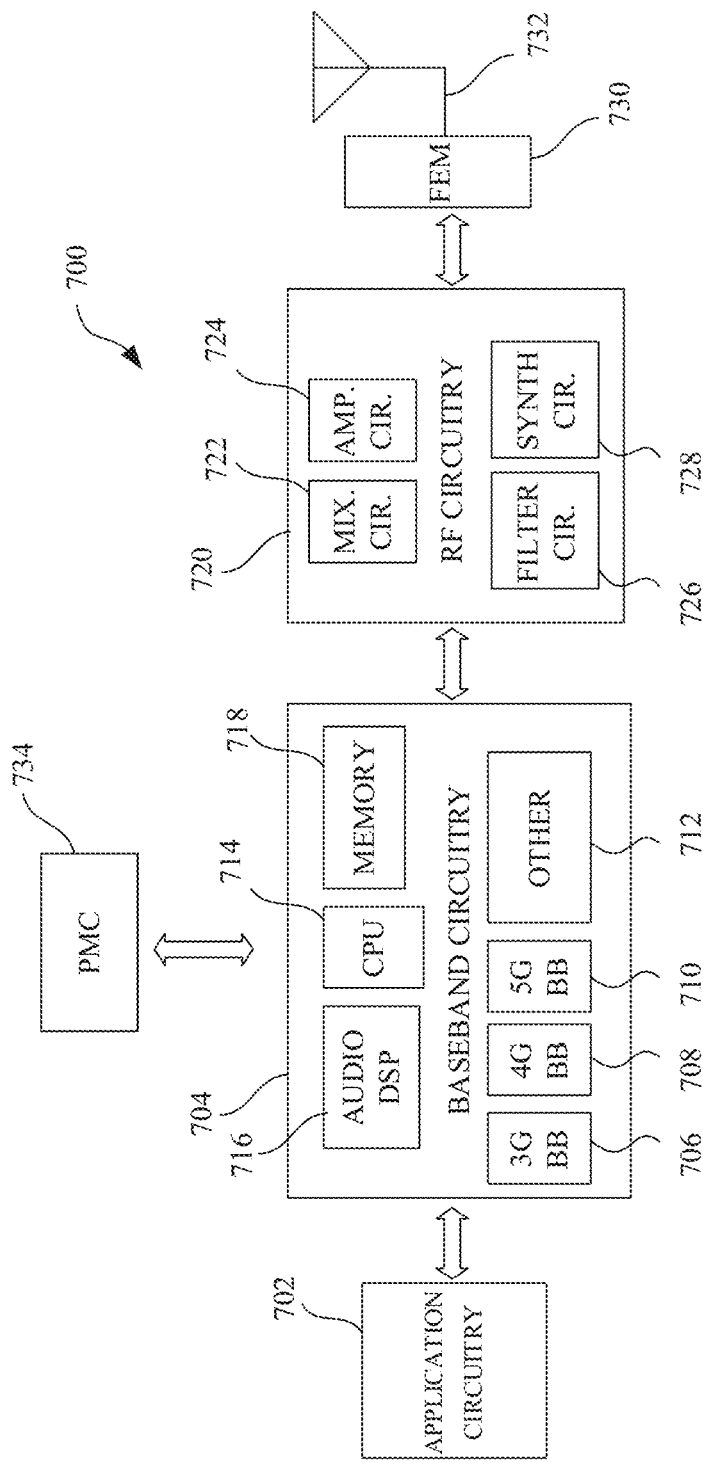
FIG. 7 illustrates a communication device (e.g., a UE or a base station) in accordance with some embodiments.

FIG. 7 illustrates a communication device (e.g., a UE or a base station) in accordance with some embodiments. FIG. 7 illustrates example components of a device 700 in accordance with some embodiments. In some embodiments, the device 700 may include application circuitry 702, baseband circuitry 704. Radio Frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband sisals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stored in the memory 718 and executed via a Central Processing Unit (CPU 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo. Viterbi. or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission. In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 of the receive signal path and the transmit signal path In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 of the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720.

In some dual-mode embodiments, a separate radio IC circuitry may be provided for processing signals for each spectrum, although the scope of the embodiments is not limited in this respect.

In some embodiments, the synthesizer circuitry 728 may be a fractional-N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage scaling, battery charging, or DC-to-DC conversion. The PMC 734 may often be included when the device 700 is capable of being powered by a battery, for example, when the device 700 is included in a EGE. The PMC 734 may increase the power conversion efficiency while providing desirable implementation size and heat dissipation characteristics.

FIG. 7 shows the PMC 734 is coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3. Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PITY) layer of a UE/RAN node, described in further detail below.

Figure 8:
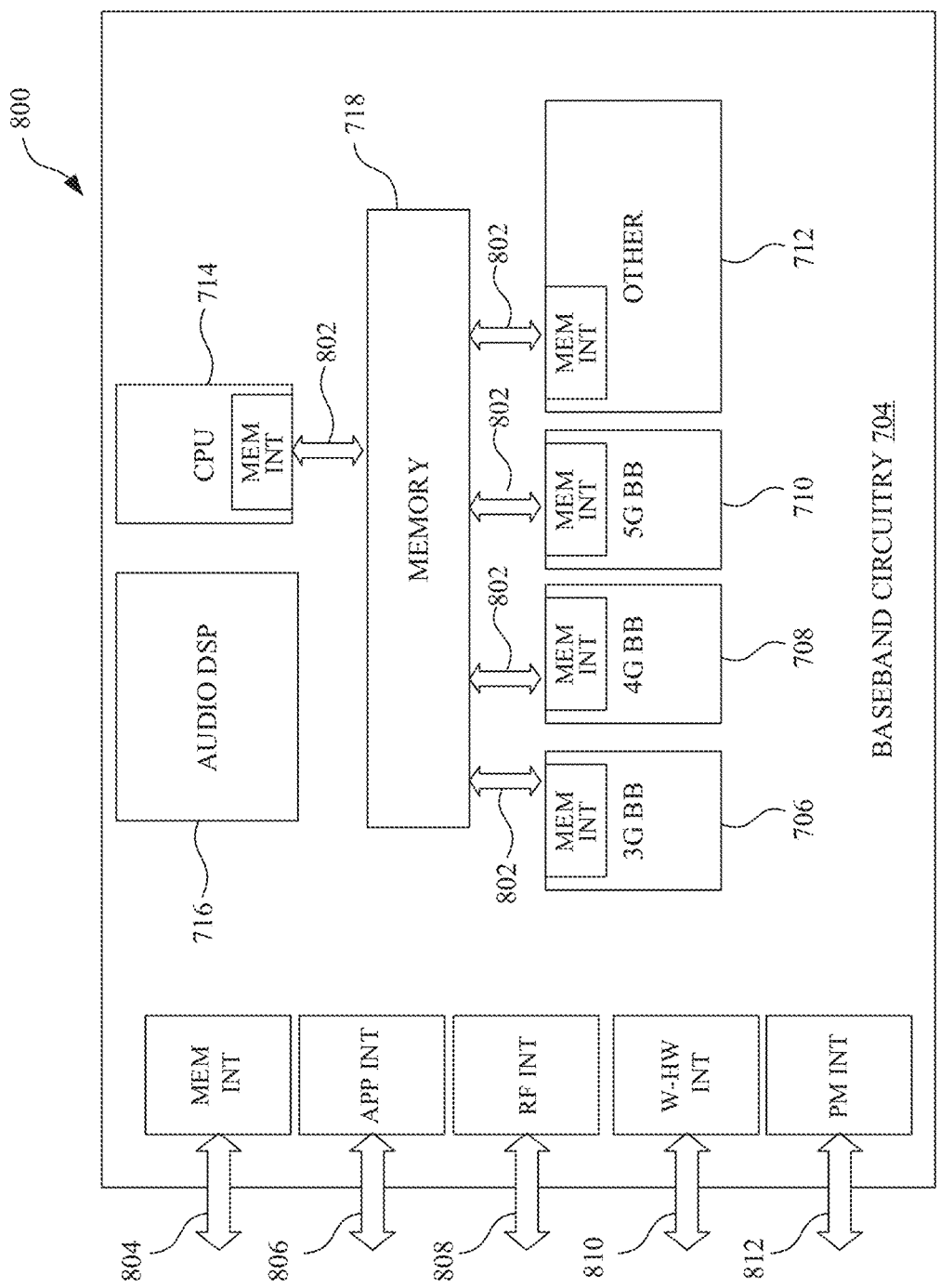
FIG. 8 illustrates exemplary interfaces of baseband circuitry in accordance with some embodiments.

FIG. 8 illustrates example interfaces 800 of baseband circuitry in accordance with some embodiments. As discussed above, the baseband circuitry 704 of FIG. 7 may comprise 3G baseband processor 706, 4G baseband processor 708. 5G baseband processor 710, other baseband processor(s) 712, CPU 714, and a memory 718 utilized by said processors. As illustrated, each of the processors may include a respective memory interface 802 to send/receive data to/from the memory 718.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF circuitry 720 of FIG. 7), a wireless hardware connectivity interface 810 (e.g., an interface to send/receive data to/from Near Field Communication (NFC) components, Bluetooth® (components (e.g., Bluetooth® Low Energy). Wi-Fi® components, and other communication components), and a power management interface 812 (e.g., an interface to send/receive power or control signals to/from the PMC 734.

Figure 9:
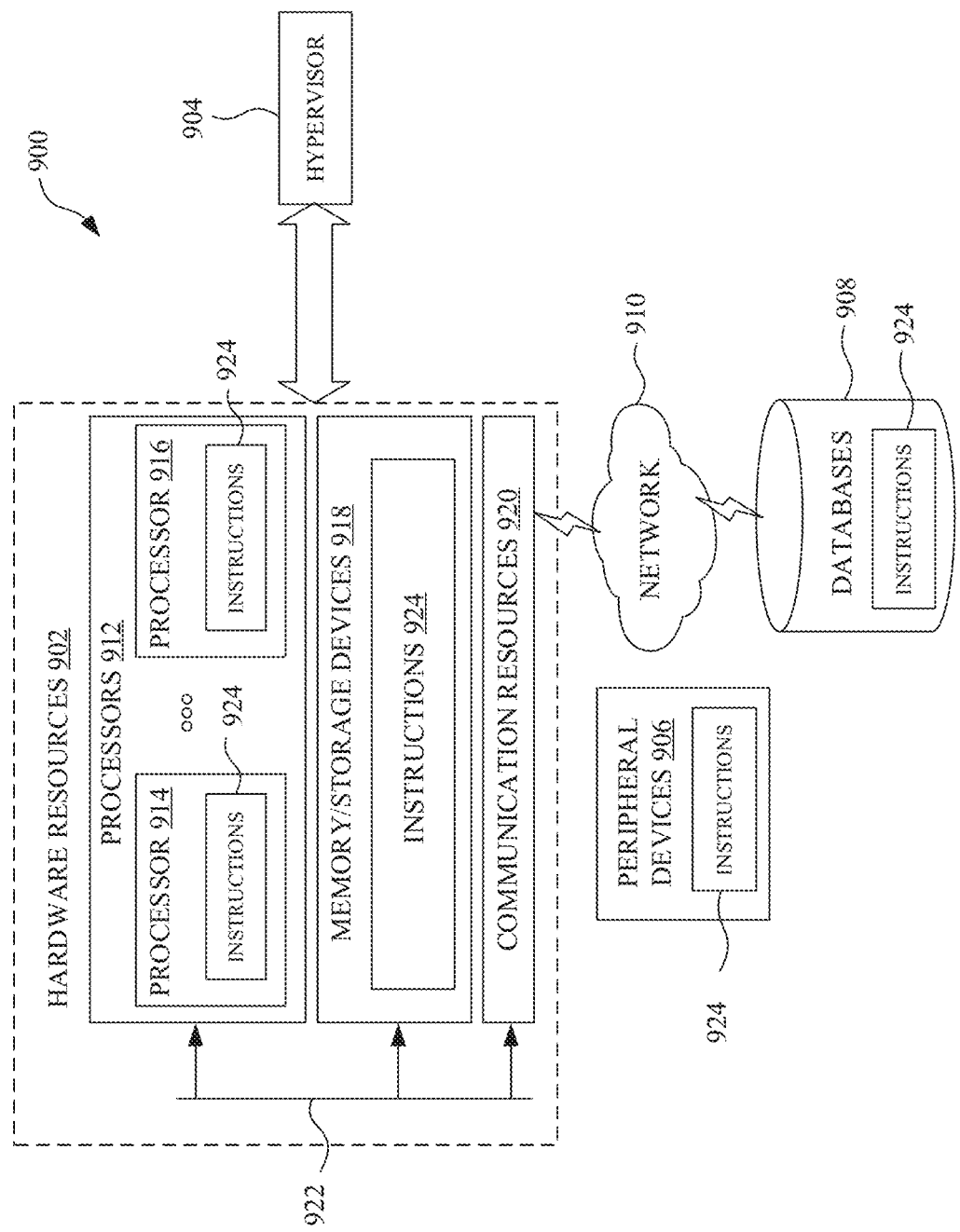
FIG. 9 illustrates components in accordance with some embodiments.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 912 (or processor cores), one or more memory/storage devices 918, and one or more communication resources 920, each of which may be communicatively coupled via a bus 922. For embodiments where node virtualization (e.g., NFV) is utilized, a hypervisor 904 may be executed to provide an execution environment for one or more network slices/sub-slices to utilize the hardware resources 902.

The processors 912 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 914 and a processor 916.

The memory/storage devices 918 may include main memory, disk storage, or any suitable combination thereof. The memory/storage devices 918 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 920 may include interconnection or network interface components or other suitable devices to communicate with one or more peripheral devices 906 or one or more databases 908 via a network 910. For example, the communication resources 920 may include wired communication components (e.g., for coupling via a Universal Serial Bus (USB)), cellular communication components, NFC components, Bluetooth®, components (e.g., Bluetooth® Low Energy), Wi-Fide®, components, and other communication components.

Instructions 924 may comprise software, a program, an application, an applet, an app, or other executable code for causing at least any of the processors 912 to perform any one or more of the methodologies discussed herein. The instructions 924 may reside, completely or partially, within at least one of the processors 912 (e.g., within the processor's cache memory), the memory/storage devices 918, or any suitable combination thereof. Furthermore, any portion of the instructions 924 may be transferred to the hardware resources 902 from any combination of the peripheral devices 906 or the databases 908. Accordingly, the memory of the processors 912, the memory/storage devices 918, the peripheral devices 906, and the databases 908 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 10:
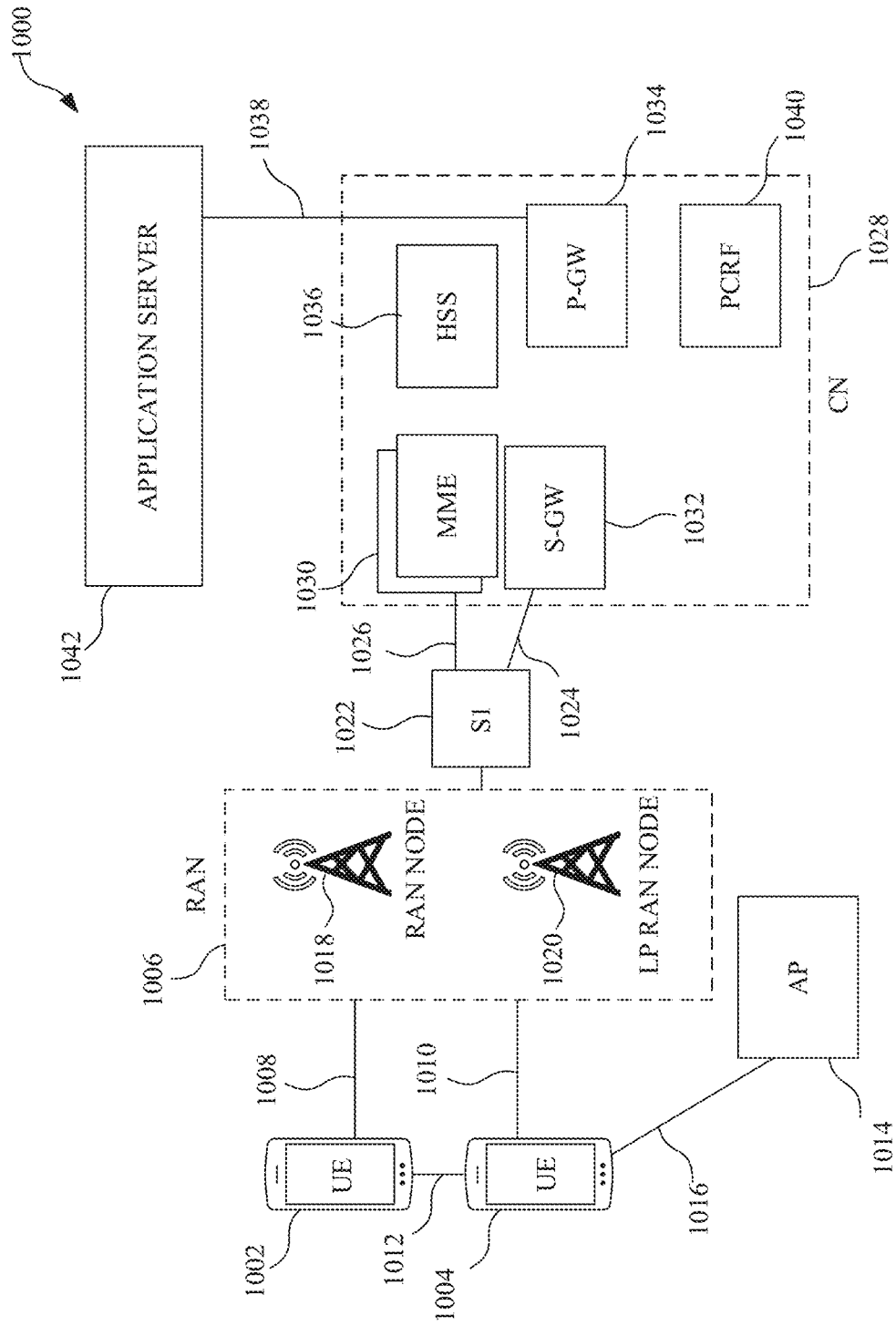
FIG. 10 illustrates an architecture of a wireless network in accordance with some embodiments.

FIG. 10 illustrates an architecture of a system 1000 of a network in accordance with some embodiments. The system 1000 includes one or more user equipment (UE), shown in this example as a UE 1002 and a UE 1004. The UE 1002 and the UE 1004 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1002 and the UE 1004 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. The UE 1002 and the UE 1004 may be configured to connect, e.g., communicatively couple, with a radio access network (RAN), shown as RAN 1006. The RAN 1006 may be, for example, an Evolved Universal Mobile Telecommunications System (UMTS) Terrestrial Radio Access Network (E-UTRAN), a NextGen RAN (NG RAN), or some other type of RAN. The UE 1002 and the UE 1004 utilize connection 1008 and connection 1010, respectively, each of which comprises a physical communications interface or layer (discussed in further detail below); in this example, the connection 1008 and the connection 1010 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1002 and the UE 1004 may further directly exchange communication data via a ProSe interface 1012. The ProSe interface 1012 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1004 is shown to be configured to access an access point (AP), shown as AP 1014, via connection 1016. The connection 1016 can comprise a local wireless connection, such as a connection consistent with any IEEE 802.11 protocol, wherein the AP 1014 would comprise a wireless fidelity (WiFi®) router. In this example, the AP 1014 may be connected to the Internet without connecting to the core network of the wireless system (described in further detail below).

The RAN 1006 can include one or more access nodes that enable the connection 1008 and the connection 1010. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell).

The RAN 1006 may include one or more RAN nodes for providing macrocells, e.g., macro RAN node 1018, and one or more RAN nodes for providing femtocells or picocells (e.g., cells having smaller coverage areas, smaller user capacity, or higher bandwidth compared to macrocells), e.g., a low power (LP) RAN node such as LP RAN node 1020. Any of the macro RAN node 1018 and the LP RAN node 1020 can terminate the air interface protocol and can be the first point of contact for the UE 1002 and the UE 1004. In some embodiments, any of the macro RAN node 1018 and the LP RAN node 1020 can fulfill various logical functions for the RAN 1006 including, but not limited to, radio network controller (RNC) functions such as radio bearer management, uplink and downlink dynamic radio resource management and data packet scheduling, and mobility management.

In accordance with some embodiments, the UE 1002 and the UE 1004 can be configured to communicate using Orthogonal Frequency-Division Multiplexing (OFDM) communication signals with each other or with any of the macro RAN node 1018 and the LP RAN node 1020 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1018 and the LP RAN node 1020 to the UE 1002 and the UE 1004, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1002 and the UE 1004. The physical downlink control channel (PDCCH) may carry information about the transport format and resource allocations related to the PDSCH channel, among other things. It may also inform the UE 1002 and the UE 1004 about the transport format, resource allocation, and H-ARQ (Hybrid Automatic Repeat Request) information related to the uplink shared channel. Typically, downlink scheduling (assigning control and shared channel resource blocks to the UE 1004 within a cell) may be performed at any of the macro RAN node 1018 and the LP RAN node 1020 based on channel quality information fed back from any of the UE 1002 and UE 1004. The downlink resource assignment information may be sent on the PDCCH used for (e.g., assigned to) each of the UE 1002 and the UE 1004.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1006 is communicatively coupled to a core network (CN), shown as CN 1028 via an S1 interface 1022. In embodiments, the CN 1028 may be an evolved packet core (EPC) network, a NextGen Packet Core (NPC) network, or some other type of CN. In this embodiment the S1 interface 1022 is split into two parts: the S1-U interface 1024, which carries traffic data between the macro RAN node 1018 and the LP RAN node 1020 and a serving gateway (S-GW), shown as S-GW 1032, and an S1-mobility management entity (MME) interface, shown as S1-MME interface 1026, which is a signaling interface between the macro RAN node 1018 and LP RAN node 1020 and the MME(s) 1030. In this embodiment, the CN 1028 comprises the MME(s) 1030, the S-GW 1032, a Packet Data Network (PDN) Gateway (P-GW) (shown as P-GW 1034), and a home subscriber server (HSS) (shown as HSS 1036). The MME(s) 1030 may be similar in function to the control plane of legacy Serving General Packet Radio Service (GPRS) Support Nodes (SGSN). The MME(s) 1030 may manage mobility aspects in access such as gateway selection and tracking area list management. The HSS 1036 may comprise a database for network users, including subscription-related information to support the network entities' handling of communication sessions. The CN 1028 may comprise one or several HSS 1036, depending on the number of mobile subscribers, on the capacity of the equipment, on the organization of the network, etc. For example, the HSS 1036 can provide support for routing/roaming, authentication, authorization, naming/addressing resolution, location dependencies, etc.

The S-GW 1032 may terminate the S1 interface 1022 towards the RAN 1006, and routes data packets between the RAN 1006 and the CN 1028. In addition, the S-GW 1032 may be a local mobility anchor point for inter-RAN node handovers and also may provide an anchor for inter-3 GPP mobility. Other responsibilities may include lawful intercept, charging, and some policy enforcement.

The P-GW 1034 may terminate an SGi interface toward a PDN. The P-GW 1034 may mute data packets between the CN 1028 (e.g., an EPC network) and external networks such as a network including the application server 1042 (alternatively referred to as application function (AF)) via an Internet Protocol (IP) interface (shown as IP communications interface 1038). Generally, an application server 1042 may be an element offering applications that use IP bearer resources with the core network (e.g., ETMTS Packet Services (PS) domain, LTE PS data services, etc.). In this embodiment, the P-GW 1034 is shown to be communicatively coupled to an application server 1042 via an IP communications interface 1038. The application server 1042 can also be configured to support one or more communication services (e.g., Voice-over-Internet Protocol (VoIP) sessions, PTT sessions, group communication sessions, social networking services, etc.) for the UE 1002 and the UE 1004 via the CN 1028.

The P-GW 1034 may further be a node for policy enforcement and charging data collection. A Policy and Charging Enforcement Function (PCRF) (shown as PCRF 1040) is the policy and charging control element of the CN 1028. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1040 may be communicatively coupled to the application server 1042 via the P-GW 1034. The application server 1042 may signal the PCRF 1040 to indicate a new service flow and select the appropriate Quality of Service (QoS) and charging parameters. The PCRF 1040 may provision this rule into a Policy and Charging Enforcement Function (PCEF) (not shown) with the appropriate traffic flow template (TFT) and QoS class of identifier (QCI), which commences the QoS and charging as specified by the application server 1042.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: acquiring a notification for participating in an access control process for an multicast/broadcast service (MBS) session; and participating in the access control process for the MBS session by using MBS specific configuration information.

Example 2 is the method of Example 1, wherein the notification for participating in the access control process for the MBS session includes an activation notification of the MBS session.

Example 3 is the method of Example 2, wherein participating in the access control process for the MBS session by using the MBS specific configuration information comprises: acquiring, as the MBS specific configuration information, an MBS specific access class barring (ACB) parameter, and applying the MBS specific ACB parameter to trigger resuming or setting up of a radio resource control (RRC) connection for the MBS session.

Example 4 is the method of Example 3, wherein acquiring the MBS specific ACB parameter comprises: acquiring access category (AC) and access identify (AI) information that is mapped to an MBS session ID of the MBS session; and identifying the MBS specific ACB parameter from the AC and AI information.

Example 5 is the method of Example 4, wherein the AC and AI information is preconfigured in user data of the UE, or received via a system information block (SIB) broadcast or a non-access stratum (NAS) MBS session joint procedure.

Example 6 is the method of Example 3, wherein acquiring the MBS specific ACB parameter comprises: receiving an MBS session specific ACB configuration that is linked to an MBS session ID of the MBS session; and identifying the MBS specific ACB parameter from the MBS session specific ACB configuration.

Example 7 is the method of Example 3, wherein acquiring the activation notification of the MBS session further comprises: acquiring multiple activation notifications of multiple MBS sessions at the same time, and wherein acquiring the MBS specific ACB parameter further comprises acquiring multiple MBS specific ACB parameters corresponding to the multiple MBS sessions at the same time, and wherein the method further comprises: before participating in the access control process for the MBS session, selecting a proper MBS specific ACB parameter among the multiple MBS specific ACB parameters based on one of the following: a maximum or minimum MBS session ID among the MBS session IDs of the multiple MBS sessions, an MBS session ID with highest QoS requirement, an MBS specific ACB parameter with highest priority, or an implementation of the UE itself.

Example 8 is the method of Example 3, wherein acquiring the activation notification of the MBS session further comprises: acquiring the activation notification of the MBS session and an activation notification of a non-MBS session at the same time, and wherein acquiring the MBS specific ACB parameter further comprises: acquiring the MBS specific ACB parameter and a non-MBS specific ACB parameter corresponding to the non-MBS session at the same time, and wherein participating in the access control process for the MBS session by using the MBS specific configuration information further comprises: before applying the MBS specific ACB parameter, determining to follow the MBS session.

Example 9 is the method of Example 2, wherein participating in the access control process for the MBS session by using the MBS specific configuration information comprises: acquiring, as the MBS specific configuration information, a dedicated random access channel (RACH) configuration for the RACH triggered by the activation notification of the MBS session; and applying the dedicated RACH configuration to an initial access triggered by the activation notification of the MBS session.

Example 10 is the method of Example 9, wherein the dedicated RACH configuration includes an MBS specific backoff parameter indicating prioritization of one or more MBS sessions, and wherein applying the dedicated RACH configuration comprises: determining a delaying time period for retransmitting a random access preamble by multiplying the MBS specific backoff parameter with a backoff indicator (BT); and retransmitting the random access preamble after the delaying time period has elapsed.

Example 11 is the method of Example 2, wherein the MBS specific configuration information includes information specific to the MBS session that is to be used during a process of an initial access triggered by the activation notification of the MBS session, and wherein participating in the access control process for the MBS session by using the MBS specific configuration information comprises: applying the information specific to the MBS session during the process of the initial access.

Example 12 is the method of Example 11, wherein applying the information specific to the MBS session comprises: generating, as the information specific to the MBS session, a cause for an access to the MBS session in a request of resuming or setting up a RRC connection; and transmitting the request of resuming or setting up the RRC connection.

Example 13 is the method of Example 11, wherein applying the information specific to the MBS session comprises: acquiring, as the information specific to the MBS session, a time period for deprioritizing an access to the MBS session; and re-accessing to the MBS session after the time period has elapsed.

Example 14 is the method of Example 11, wherein applying the information specific to the MBS session comprises: generating, as the information specific to the MBS session, information about the activated MBS session in a message informing of an completion of the initial access for the MBS session; and transmitting the message informing of the completion of the initial access for the MBS session.

Example 15 is a method for a base station, comprising: providing a notification for an access control process for an multicast/broadcast service (MBS) session; and performing the access control process for the MBS session by using the MBS specific configuration information.

Example 16 is the method of Example 15, wherein the notification for the access control process for the MBS session includes an activation notification of the MBS session.

Example 17 is the method of Example 16, performing the access control process for the MBS session by using the MBS specific configuration information comprises: providing, as the MBS specific configuration information, an MBS specific access class barring (ACB) parameter, which is to be used for triggering of resuming or setting up of a radio resource control (RRC) connection for the MBS session.

Example 18 is the method of Example 17, wherein providing the MBS specific ACB parameter comprises: providing access category (AC) and access identify (AI) information that is mapped to an MBS session ID of the MBS session, from which the MBS specific ACB parameter is identified.

Example 19 is the method of Example 18, wherein providing the AC and AI information comprises: sending the AC and AI information via a system information block (SIB) broadcast or a non-access stratum (NAS) MBS session joint procedure.

Example 20 is the method of Example 17, wherein providing the MBS specific ACB parameter comprises: sending an MBS session specific ACB configuration that is linked to an MBS session II) of the MBS session, from which the MBS specific ACB parameter is identified.

Example 21 is the method of Example 16, wherein performing the access control process for the MBS session by using the MBS specific configuration information comprises: providing, as the MBS specific configuration information, a dedicated random access channel (RACH) configuration for the RACH triggered by the activation notification of the MBS session, which is to be used for an initial access triggered by the activation notification of the MBS session.

Example 22 is the method of Example 21, wherein the dedicated RACH configuration includes an MBS specific backoff parameter indicating prioritization of one or more MBS sessions, which is to be multiplied with a backoff indicator (BI) to determine a delaying time period for retransmitting of a random access preamble.

Example 23 is the method of Example 16, wherein the MBS specific configuration information includes information specific to the MBS session that is to be used during a process of an initial access triggered by the activation notification of the MBS session.

Example 24 is the method of Example 23, wherein performing the access control process for the MBS session by using the MBS specific configuration information further comprises: receiving, as the information specific to the MBS session, a cause for an access to the MBS session, which is to be used for resuming or setting up of a RRC connection for the MBS session.

Example 25 is the method of Example 23, wherein performing the access control process for the MBS session by using the MBS specific configuration information further comprises: providing, as the information specific to the MBS session, a time period for deprioritizing an access to the MBS session, which is to be used for re-accessing to the MBS session after the time period has elapsed.

Example 26 is the method of Example 23, wherein performing the access control process for the MBS session by using the MBS specific configuration information further comprises: receiving, as the information specific to the MBS session, information about the activated MBS session, via a message informing of an completion of the initial access for the MBS session.

Example 27 is the method of Example 26, further comprising: upon completion of the initial access for the MBS session, determining a point-to-multipoint (PTM) or point-to-point (PIP) MBS configuration in a RRC connected mode, or performing a handover to a cell where the MBS session is to be provided.

Example 28 is an apparatus for a user equipment (UE), the apparatus comprising: one or more processors configured to perform steps of the method according to any of Examples 1-14.

Example 29 is an apparatus for a base station, the apparatus comprising: one or more processors configured to perform steps of the method according to any of Examples 15-27.

Example 30 is a computer readable medium having computer programs stored thereon which, when executed by one or more processors, cause an apparatus to perform steps of the method according to any of Examples 1-27.

Example 31 is an apparatus for a communication device, comprising means for performing steps of the method according to any of Examples 1-27.

Example 32 is a computer program product comprising computer programs which, when executed by one or more processors, cause an apparatus to perform steps of the method according to any of Examples 1-27.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method comprising:
acquiring a notification for participating in an access control process for a multicast/broadcast service (MBS) session, wherein the notification includes an activation notification of the MBS session;
identifying MBS-specific configuration information that includes information specific to the MBS session that is to be used during a process of an initial access triggered by the activation notification of the MBS session; and
participating in the access control process for the MBS session by applying the information specific to the MBS session during the process of the initial access.

2. The method of claim 1, further comprising:
acquiring an MBS specific access class barring (ACB) parameter; and
applying the MBS specific ACB parameter to trigger resuming or setting up a radio resource control (RRC) connection for the MBS session.

3. The method of claim 2, wherein acquiring the MBS specific ACB parameter comprises:
acquiring access category (AC) and access identify (AI) information that is mapped to an MBS session ID of the MBS session; and
identifying the MBS specific ACB parameter from the AC and AI information.

4. The method of claim 3, wherein the method is performed by a user equipment (UE) and the AC and AI information is preconfigured in user data of the UE, or received via a system information block (SIB) broadcast or a non-access stratum (NAS) MBS session joint procedure.

5. The method of claim 2, wherein acquiring the MBS specific ACB parameter comprises:
receiving an MBS session specific ACB configuration that is linked to an MBS session ID of the MBS session; and
identifying the MBS specific ACB parameter from the MBS session specific ACB configuration.

6. The method of claim 2, wherein the method is performed by a user equipment (UE) and further comprises:
acquiring a plurality of activation notifications corresponding to a respective plurality of MBS sessions, wherein the plurality of activation notifications include the notification;
acquiring a plurality of MBS specific ACB parameters respectively corresponding to the plurality of MBS sessions at the same time, wherein the plurality of MBS specific ACB parameters include the MBS specific ACB parameter; and
selecting the MBS specific ACB parameter from the plurality of MBS specific ACB parameters based on: a maximum or minimum MBS session identifier (ID) among MBS session IDs of the plurality of MBS sessions; an MBS session ID with highest Qos requirement; an MBS specific ACB parameter with highest priority; or an implementation of the UE.

7. The method of claim 2, wherein:
acquiring the activation notification of the MBS session further comprises: acquiring the activation notification of the MBS session and an activation notification of a non-MBS session at a same time;
acquiring the MBS specific ACB parameter includes acquiring the MBS specific ACB parameter and a non-MBS specific ACB parameter corresponding to the non-MBS session at a same time; and
before applying the MBS specific ACB parameter, determining to follow the MBS session.

8. The method of claim 1, further comprising:
acquiring a dedicated random access channel (RACH) configuration for a RACH triggered by the activation notification of the MBS session; and
applying the dedicated RACH configuration to an initial access triggered by the activation notification of the MBS session.

9. The method of claim 8, wherein the dedicated RACH configuration includes an MBS specific backoff parameter indicating prioritization of one or more MBS sessions, and wherein applying the dedicated RACH configuration comprises:
determining a delaying time period for retransmitting a random access preamble by multiplying the MBS specific backoff parameter with a backoff indicator (BI); and
retransmitting the random access preamble after the delaying time period has elapsed.

10. A method comprising:
providing a notification for an access control process for a multicast/broadcast service (MBS) session, wherein the notification for the access control process for the MBS session includes an activation notification of the MBS session; and
performing the access control process for the MBS session by using MBS specific configuration information, wherein the MBS specific configuration information includes information specific to the MBS session that is to be used during a process of an initial access triggered by the activation notification of the MBS session.

11. The method of claim 10, further comprising:
providing an MBS specific access class barring (ACB) parameter, which is to be used for triggering of resuming or setting up a radio resource control (RRC) connection for the MBS session.

12. The method of claim 11, wherein providing the MBS specific ACB parameter comprises:
providing access category (AC) and access identify (AI) information that is mapped to an MBS session ID of the MBS session, from which the MBS specific ACB parameter is identified.

13. The method of claim 12, wherein providing the AC and AI information comprises:
sending the AC and AI information via a system information block (SIB) broadcast or a non-access stratum (NAS) MBS session joint procedure.

14. The method of claim 11, wherein providing the MBS specific ACB parameter comprises:
sending an MBS session specific ACB configuration that is linked to an MBS session ID of the MBS session, from which the MBS specific ACB parameter is identified.

15. The method of claim 10, further comprising:
providing a dedicated random access channel (RACH) configuration for a RACH triggered by the activation notification of the MBS session, which is to be used for an initial access triggered by the activation notification of the MBS session.

16. The method of claim 15, wherein the dedicated RACH configuration includes an MBS specific backoff parameter indicating prioritization of one or more MBS sessions, which is to be multiplied with a backoff indicator (BI) to determine a delaying time period for retransmitting of a random access preamble.

* * * * *